INVENTORS
LOWERY K. JONES, JR. &
JAMES D. TURNER

BY Louis A Kline
Albert L. Sessler, Jr.
THEIR ATTORNEYS

INVENTORS
LOWERY K. JONES, JR. &
JAMES D. TURNER

BY Louis A. Kline
Albert L. Sessler, Jr.
THEIR ATTORNEYS

United States Patent Office 3,539,832
Patented Nov. 10, 1970

3,539,832

SWITCHING MEANS EMPLOYING UNIDIRECTIONAL SIGNAL TRANSLATING DEVICE

Lowery K. Jones, Jr., and James D. Turner, Dayton, Ohio, assignors to The National Cash Register Company, Dayton, Ohio, a corporation of Maryland Original application Apr. 27, 1964, Ser. No. 362,854, now Patent No. 3,375,497, dated Mar. 26, 1968. Divided and this application Oct. 10, 1967, Ser. No. 674,344
Int. Cl. H03k 17/00
U.S. Cl. 307—246 4 Claims

ABSTRACT OF THE DISCLOSURE

Switching circuitry for establishing and interrupting electrical conduction in a circuit path. A unidirectional signal translating device, such as a silicon controlled rectifier, having an anode, a cathode, and a control gate, is employed. Initiation of conduction of this signal translating device, through the anode and the cathode thereof, is controlled by application of a signal to the control gate, over a branch circuit. Termination of conduction of the signal translating device is caused by operation of a separate reset circuit to reverse-bias the signal translating device for a short period of time.

This is a division of U.S. patent application Ser. No. 362,854 filed Apr. 27, 1964, now U.S. Letters Pat. No. 3,375,497, issued Mar. 26, 1968.

This invention relates generally to switching means. More particularly, the invention relates to switching means which may be employed in combination with one or more selected elements, such as solenoids, for operating or energizing such elements.

The switching means of the present invention employs a unidirectional signal translating device having an anode, a cathode, and a control gate. Initiation of conduction of this signal translating device, through the anode and cathode thereof, is controlled by application of a signal to the control gate, over a branch circuit. Termination of conduction of the signal translating device is caused by operation of a separate reset circuit to reverse-bias the signal translating device for a short period of time. One type of component which can be used as the unidirectional signal translating device is a silicon controlled rectifier, although other types of components could also be used, such as, for example, a thyratron or a gate turn-off switch.

Accordingly, an object of the present invention is to provide an effective, simple, and inexpensive switching means.

Another object is to provide a switching means utilizing a unidirectional signal translating device having an anode, a cathode, and a control gate, said device being rendered conducting by application of an appropriate signal to the control gate, and being rendered non-conducting by operation of a reset circuit to reverse-bias the signal translating device.

With these and incidental objects in view, the invention includes certain novel features of construction and combinations of parts, a preferred form or embodiment of which is hereinafter described with reference to the drawings which accompany and form a part of this specification.

Figure 1:
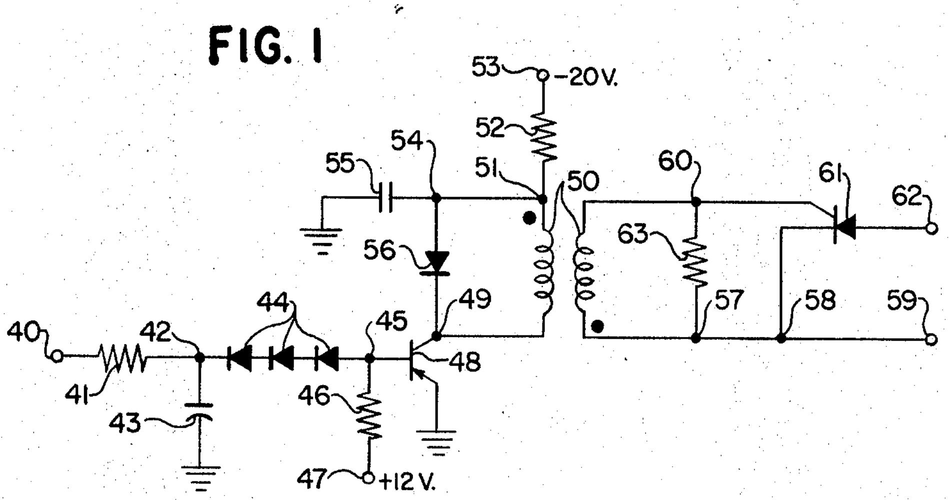
FIG. 1 is a schematic diagram of a switching circuit.

The switching circuit shown in FIG. 1 has been found to be quite suitable for use as a row driver and a rank driver in a matrix having a plurality of individually energizable solenoids arranged in rows and ranks, such as is shown in the co-pending parent application, Ser. No. 362,854. Input means for the circuit of FIG. 1 are provided for by a terminal 40, which will, if the circuit is used as a driver, be connected to a row select means (not shown) or to a rank select means (not shown). The terminal 40 is connected over a 1200-ohm resistor 41 to a point 42 in the driver circuit. A first branch of the circuit from the point 42 extends over a 0.039-microfarad capacitor 43 to a ground connection. A second branch of the circuit extends from the point 42 over three serially-connected diodes 44, which may be of type SG757, manufactured by Transitron Electronic Corporation, to a point 45. The resistor 41, the capacitor 43, and the diodes 44 form a noise-limiting network to prevent spurious noise pulses from triggering the circuit of FIG. 1.

From the point 45, the circuit extends over an 8000-ohm resistor 46 to a terminal 47, to which is applied a plus 12-volt source of D.C. potential. The point 45 is also connected to the base circuit of a signal translating device 48, which may be a PNP-type transistor of type NCR525, which has the same general characteristics as the transistor of type 2N525 manufactured by General Electric Company. The emitter of said transistor is connected to ground, while the collector of said transistor is connected over a point 49 to one end of the primary of a transformer 50, which may be of the air core type. The other side of the primary of the transformer 50 is connected over a point 51 and a 3900-ohm resistor 52 to a terminal 53, to which is applied a source of minus 20-volt D.C. potential. From the point 51 a circuit branch extends over a point 54 and a 0.047-microfarad capacitor 55 to a ground connection. A diode 56, which may be of type 1N949, manufactured by Transitron Electronic Corporation, is connected between the points 49 and 54, and functions to prevent the transistor 48 from being damaged by an inductive kick from the transformer 50.

The secondary of the transformer 50 is connected at one end over points 57 and 58 to a terminal 59. When the switching circuit of FIG. 1 is used as a row driver, the terminal 59 is connected to the solenoid matrix, as shown in the co-pending parent application, Ser. No. 362,854. When the circuit of FIG. 1 is used as a rank driver, the terminal 59 is connected to an associated rank reset means.

The other end of the secondary of the transformer 50 is connected over a point 60 to the control gate of a unidirectional signal translating device 61, shown in FIG. 1 as a silicon controlled rectifier, which may be of type C12A, manufactured by General Electric Company. Other types of unidirectional signal translating devices, such as a thyratron or a gate turn-off switch, may be used in place of the silicon controlled rectifier, if desired. In such case, any necessary modifications of the circuitry would be well within the skill of one versed in the art.

The cathode of the silicon controlled rectifier 61 is connected to the point 58, and its anode is connected to a terminal 62. A 1000-ohm resistor 63 is connected between the points 57 and 60, between the cathode and the control gate of the silicon controlled rectifier 61.

It may be noted that when the switching circuit of FIG. 1 is used as a row driver, the terminal 62 is connected to an associated row reset means. When the circuit of FIG. 1 is used as a rank driver, the terminal 62 is connected to the solenoid matrix, as shown in the co-pending parent application Ser. No. 362,854.

The mode of operation of the circuit of FIG. 1 will now be described, with the aid of the wave forms shown in FIG. 2, which represent signals at various points in said circuit, during its operation. It should be noted that the various voltage levels shown in FIG. 2 and described in the specification, as well as the specified values of the various components of the circuit of FIG. 1, are merely illustrative and could be altered to meet different circuit requirements.

Let it be assumed that the circuit of FIG. 1 is being used as a row driver and initially has a potential of zero volts applied at terminal 40, and a potential of plus 50 volts at terminal 62. Current flow from the plus 12-volt terminal 47 over the resistor 46, the point 45, the diodes 44, the point 42, and the capacitor 43, to ground, causes the capacitor 43 to charge to plus 2 volts. The potential at the point 45 in the base circuit of the transistor 48 is at approximately plus 3.5 volts, as may be seen in FIG. 2, which is effective to reverse-bias the transistor and prevent its conduction.

With the transistor 48 cut off, there is no current flow through its collector circuit, and the potential at the points 49 and 51 is therefore minus 20 volts. The capacitor 55 accordingly charges to minus 20 volts.

The voltage level at the input terminal 40 varies between logical levels of zero volts and minus 8 volts. Let it now be assumed that an input pulse of minus 8 volts, of approximately 55 microseconds duration, is appplied to the terminal 40. The capacitor 43 accordingly discharges to a potential of minus 4 volts in approximately 32 microseconds. The minus 4 volts potential at point 42 is sufficient to override the combined voltage drop of the serially-connected diodes 44, and causes the potential at point 45 in the base circuit of the transistor 48 to go to approximately minus 0.2 volts, which is sufficient to cause the transistor to commence conducting. This completes a circuit from ground, through the transistor, emitter to collector, and through the primary of the transformer 50, discharging the capacitor 55.

Figure 2:
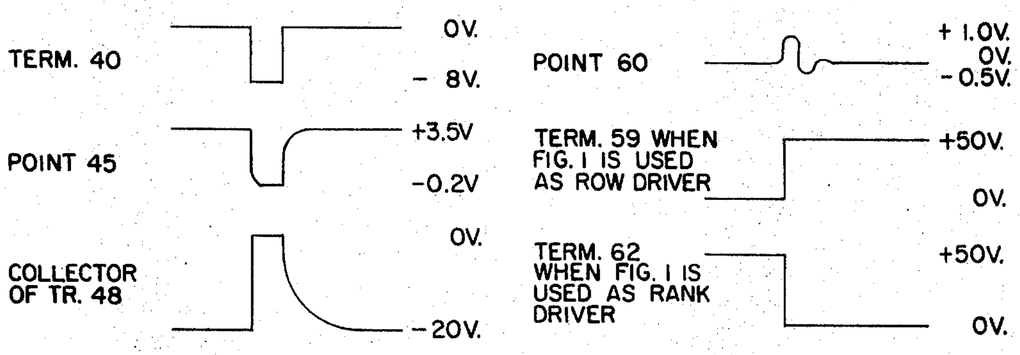
FIG. 2 shows a plurality of wave forms illustrating the signals at various points in the circuit of FIG. 1 during its operation.

A wave form induced by the primary on the secondary of the transformer 50 is applied between the gate and the cathode of the silicon controlled rectifier 61, and is shown in FIG. 2 as it appears at point 60. The positive portion of the wave form, applied to the control gate, is effective to fire the silicon controlled rectifier, causing it to conduct in the forward direction, establishing a conductive path between the terminals 62 and 59. The wave form at terminal 59 is shown in FIG. 2 for the situation in which the circuit of FIG. 1 is used as a row driver, and the wave form at terminal 62 is shown in FIG. 2 for the situation in which the circuit of FIG. 1 is used as a rank driver. It may be noted that when the circuit is used as a row driver, the terminal 62 remains at plus 50 volts potential, and when the circuit of FIG. 1 is used as a rank driver, the terminal 59 remains at zero volts potential.

Once the silicon controlled rectifier 61 has commenced conducting, its gate has no further control over it. To terminate conduction of the rectifier 61, it is reverse-biased, cathode to anode. This is accomplished by the reset circuit of FIG. 3, which will now be described.

Figure 3:
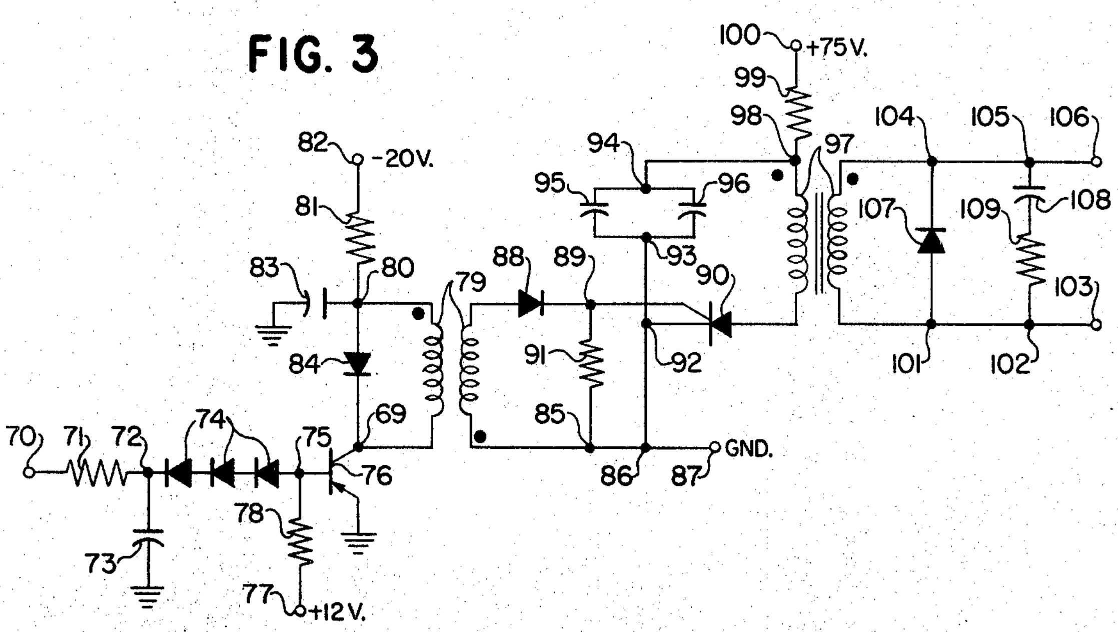
FIG. 3 is a schematic diagram of a reset circuit which may be used with the switching circuit of FIG. 1.

It will be noted that a considerable portion of the reset circuit of FIG. 3 is practically identical to the circuit of FIG. 1, and therefore the description of that portion of the circuit, and its operation, will be somewhat brief, since reference may be had to the description of the circuit of FIG. 1 for a more complete explanation.

An input signal for the circuit of FIG. 3 is applied to a terminal 70, which is connected over a 1210-ohm resistor 71 to a point 72, from which one circuit branch extends over a 0.039-microfarad capacitor 73 to ground, while a second branch extends over three serially-connected diodes 74, which may be of type SG757, manufactured by Transitron Electronic Corporation, to a point 75 in the base circuit of a PNP-type transistor 76, which may be of type NCR525, which has the same general characteristics as a transistor of type 2N525, manufactured by General Electric Company. A terminal 77, to which a source of plus 12-volt D.C. potential is applied, is connected to the point 75 over an 8060-ohm resistor 78. As was mentioned in the description of FIG. 1, the resistor 71, the capacitor 73, and the diodes 74 form a noise-limiting network to prevent spurious noise pulses from triggering the circuit of FIG. 3.

The emitter of the transistor 76 is connected to ground, while the collector of said transistor is connected over a point 69 to one end of the primary winding of a transformer 79, which may be of the air core type. The other end of the primary winding of the transformer 79 is connected to a point 80. One circuit branch extends from the point 80 over a 3900-ohm resistor 81 to a terminal 82, to which is applied a source of minus 20-volt D.C. potential. A second branch extends from the point 80 over a 0.047-microfarad capacitor 83 to ground. Between the points 69 and 80 is connected a diode 84, which may be of type 1N949, manufactured by Transitron Electronic Corporation, and which is provided to prevent damage to the transistor 76 by an inductive kick from the transformer 79.

One end of the secondary winding of the transformer 79 is connected over points 85 and 86 to a terminal 87, to which may be applied a ground connection. The other end of the secondary winding of the transformer 79 is connected over a diode 88, which may be of type DR453, manufactured by Sylvania Electric Products, Incorporated, and a point 89 to the control gate of a silicon controlled rectifier 90, which may be of type C12A, manufactured by General Electric Company. Between the points 85 and 89 is connected a 1000-ohm resistor 91.

The cathode of the silicon controlled rectifier 90 is connected at a point 92 to a conductor extending between the point 86 and a point 93. Between the point 93 and a point 94 are connected in parallel two capacitors 95 and 96, having a capacitance of 10 microfarads each.

The anode of the silicon controlled rectifier 90 is connected to one end of the primary winding of an iron core transformer 97. In the illustrated embodiment, this is a 1:1.76 step-up transformer with no phase inversion. The other end of the primary winding of the transformer 97 is connected to a point 98. One circuit path extends from the point 98 to the previously-mentioned point 94, and a second circuit path extends from the point 98 over a 100-ohm resistor 99 to a terminal 100, to which is applied a source of plus 75-volt D.C. potential.

The secondary winding of the transformer 97 is connected at one end over points 101 and 102 to a terminal 103, and is connected at its other end over points 104 and 105 to a terminal 106. A diode 107, which may be of type 10B6, manufactured by International Rectifier Corporation, is connected between the two points 101 and 104, while a serial combination of a 0.01-microfarad capacitor 108 and a 75-ohm resistor 109, provided to cause attenuation of undesired voltage transients at the time the driver turns off, is connected between the points 102 and 105.

When the circuit of FIG. 3 is used as a row reset means, in association with one or more row drivers, the terminal 106 is connected to a plus 50-volt D.C. source of potential, and the terminal 103 is connected over a conductor to the terminal 62 of the circuit of FIG. 3, it being assumed that the circuit of FIG. 1 is being used as a row driver.

When the circuit of FIG. 3 is used as a rank reset means in association with one or more rank drivers, the terminal 103 is connected to ground, and the terminal 106 is connected to a conductor which, in turn, is connected to the terminal 59 of the circuit of FIG. 1, it being assumed that the circuit of FIG. 1 is used as a rank driver.

The mode of operation of the circuit of FIG. 3 will now be described, with the aid of the wave forms shown in FIG. 4, which represents signals at various points in said circuit, during its operation. It should be noted that the various signals described in the specification and shown in FIG. 4, as well as the specified values of the various components of the circuit of FIG. 3, are merely illustrative, and could be altered to meet different circuit requirements.

Let is be assumed that the circuit of FIG. 3 is being used as a row reset means, and initially has a potential of zero volts applied at terminal 70, and a potential of plus 50 volts at terminal 106, with terminal 103 being connected to the terminal 62 of one or a plurality of row drivers, said row drivers using the circuit shown in FIG. 1. If one of the row drivers has previously been rendered conducting by an input pulse of minus 8 volts at its terminal 40, then a current path for energizing a solenoid has been established, and extends from a plus 50-volt terminal (not shown) over the terminal 106 of FIG. 3, through the low-impedance secondary winding of the transformer 97, over the terminal 103, over a conductor to the terminal 62 of the selected row driver, and thence through the remainder of the energizing circuit.

As has been previously described in connection with the similar circuit of FIG. 1, current flow from the plus 12-volt terminal 77 over the resistor 78, the point 75, the diode 74, the point 72, and the capacitor 73, to ground, causes said capacitor to charge to plus 2 volts. The potential at the point 75 is at approximately plus 3.5 volts, which reverse-biases the transistor 76 and prevents conduction therethrough.

With the transistor 76 cut off, there is no current flow through its collector circuit, and the potential at the points 78 and 80 is minus 20 volts, so that the capacitor 83 is charged to minus 20 volts.

When an input pulse of minus 8 volts is applied to the terminal 70 of the circuit of FIG. 3, the capacitor 73 discharges to minus 4 volts, as shown by the wave form for point 72 in FIG. 4, which causes the transistor 76 to commence conducting, as shown by the wave form for point 69, thereby discharging the capacitor 83 through the primary of the transformer 79, in the same manner as described in connection with the circuit of FIG. 1.

This causes a wave form induced by the primary on the secondary of the transformer 79 to be applied between the gate and the cathode of the silicon controlled rectifier 90. This wave form, applied to the control gate of the rectifier 90 over the diode 88 and the point 89, as may be seen in FIG. 4, is effective to cause it to commence conducting in the forward direction.

The storage capacitors 95 and 96 have previously been charged to the level of the plus 75-volt supply. Firing the silicon controlled rectifier 90 discharges the capacitors 95 and 96 into the primary of the transformer 97. This action produces a transient oscillatory effect, and a resulting signal is induced in the secondary winding of the transformer 97. Also, because of the transient oscillatory effect, the silicon controlled rectifier 90 is reverse-biased, by a negative swing of the signal on its anode, as shown in FIG. 4, and the conduction of said rectifier is thereby terminated. The secondary of the transformer 97 is in series with the path conducting D.C. current from a plus 50-volt terminal (not shown) through the row driver to the selected solenoid. Opposing voltage induced in the secondary winding of the transformer 97 as a result of the discharge of capacitors 95 and 96 produces a large counter EMF, which takes the form of a 125-volt negative-going spike on the terminal 103, as shown in FIG. 4, and which reverse-biases the previously conducting silicon controlled rectifier 61 of the selected row driver. This causes the silicon controlled rectifier to cease conducting, and thereby interrupts the energizing circuit for the solenoid.

Figure 4:
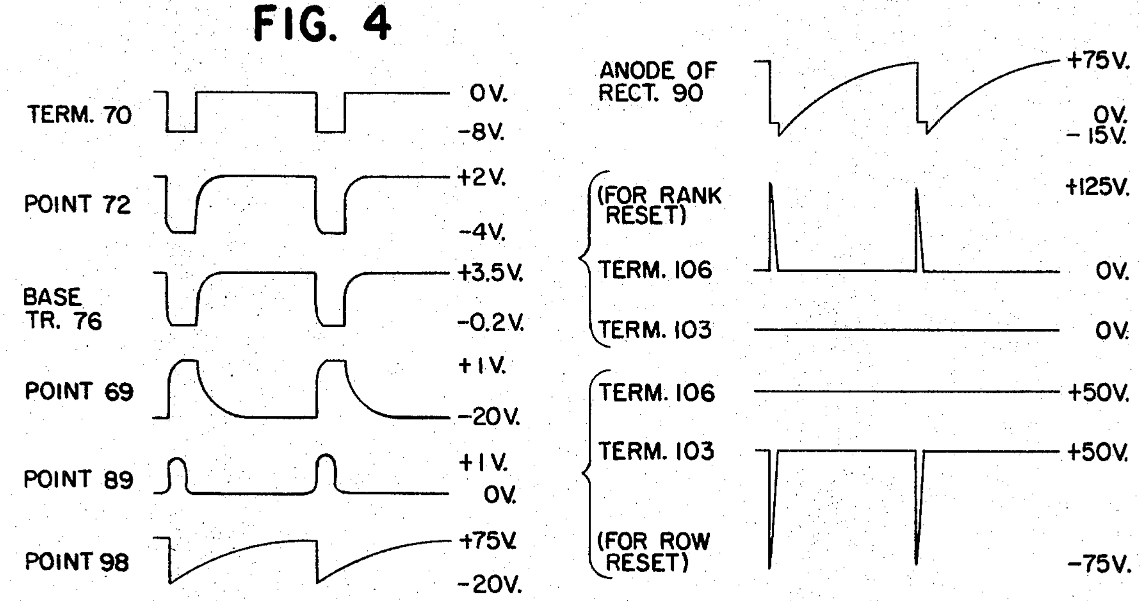
FIG. 4 shows a plurality of wave forms illustrating the signals at various points in the circuit of FIG. 3 during its operation.

In a like manner, the conducting silicon controlled rectifier 61 of the selected rank driver is reverse-biased by a 125-volt positive-going spike on the terminal 106 of its associated rank reset means at the same time, as shown in FIG. 4, and conduction of the silicon controlled rectifier 61 of the selected rank driver is thereby terminated.

The diode 107 is provided in the circuit of FIG. 3 in order to clamp the potential at the anode of the silicon controlled rectifier 61 in the row driver at no more than plus 50 volts, in order to protect said rectifier. If the diode 107 were not included in the circuit, it is possible that the transient oscillatory effect in the circuit of FIG. 3 might result in producing a momentary pulse of greater than plus 50 volts which could exceed the rating of the silicon controlled rectifier 61 and thereby damage it.

If desired, two secondaries may be used with a single primary of the transformer 97, with one secondary being associated with the rank drivers and the other being associated with the row drivers. This would enable the use of a single reset circuit of the type shown in FIG. 3, which would be effective to terminate conduction simultaneously of both the selected row driver and the selected rank driver.

It will be seen from the above description that the circuits of FIGS. 1 and 3 may be combined to provide a simple and effective switching means for controlling conduction through a circuit path, with the circuit of FIG. 1 providing means to initiate conduction through the unidirectional signal translating device 61, and the circuit of FIG. 3 providing means to terminate the conduction through said device.

While the form of device shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A switching device comprising, in combination, a unidirectional signal translating device having an anode, a cathode, and a control gate;

a biasing circuit connecting the cathode and control gate of the unidirectional signal translating device, and also including the secondary of a transformer for establishing a bias voltage between the control gate and cathode of the unidirectional signal translating device to effect conduction through the anode and cathode of said device; and a control circuit including the primary of said transformer, an additional signal translating device having an emitter electrode connected to a reference potential, a collector electrode connected to one end of said primary and a control electrode, capacitive means having one side connected to a reference potential and having the other side connected to a source of potential and to the other end of said primary, and signal input means connected to the control electrode of said additional signal translating device on which a switching signal may be applied to cause selective conduction of said additional signal translating device to apply a signal from the capacitive means, when charged, to the primary of said transformer, whereby a signal applied to the signal input means causes application of a signal to the primary of the transformer, which causes a signal to be induced in the secondary of the transformer, which is effective to bias the control gate of the unidirectional signal translating device to cause conduction through the anode and cathode of said device.

2. The switching device of claim 1 in which the unidirectional signal translating device is a silicon controlled rectifier.

3. A pulse generating circuit comprising, in combination, a unidirectional signal translating device having an anode, a cathode, and a control gate;

a biasing circuit connecting the cathode and control gate of the unidirectional signal translating device, and also including the secondary of a first transformer, for establishing a bias voltage between the control gate and cathode of the unidirectional signal translating device to effect conduction through the anode and cathode of said device;

a control circuit including the primary of said first transformer, an additional signal translating device and signal input means for causing conduction of said additional signal translating device to apply a signal to the primary of said first transformer;

a second control circuit including the anode and cathode of said unidirectional signal translating device, capacitive means, and the primary of a second transformer; and an output circuit, including a secondary of said second transformer, a serial combination of capacitance and resistance, and signal output means from which a generated pulse can be taken, whereby a signal applied to the signal input means causes conduction through the unidirectional signal translating device to initiate a pulse on the signal output means, and whereby oscillation of the second control circuit subsequently terminates conduction through the unidirectional signal translating device, thereby terminating the pulse on the signal output means.

4. The pulse generating circuit of claim 3 in which the unidirectional signal translating device is a silicon controlled rectifier.

References Cited

UNITED STATES PATENTS

| | | | |
|---|---|---|---|
| 3,045,148 | 7/1962 | McNulty et al. | 307—252 X |
| 3,138,722 | 6/1964 | Morgan | 307—252 |
| 3,165,649 | 1/1965 | Ault | 307—252 |
| 3,194,987 | 7/1965 | Mandel | 307—252 |
| 3,331,968 | 7/1967 | Hickey | 328—67 X |
| 3,387,177 | 6/1968 | Israel et al. | 328—67 X |
| 3,075,136 | 1/1963 | Jones | 307—252 X |
| 3,196,329 | 7/1965 | Cook et al. | 307—252 X |
| 3,304,487 | 2/1967 | McCaskey | 307—252 X |
| 3,320,521 | 5/1967 | Segawa et al. | 307—252 X |

OTHER REFERENCES

Pub. I: "Solid State Products, Inc. Bulletin," D-420-02-12-59, pp. 22-24, dated December 1959.

STANLEY D. MILLER, Primary Examiner

U.S. Cl. X.R.

307—252, 260, 270, 282, 284; 328—67